(12) United States Patent
Pahl et al.

(10) Patent No.: US 12,712,356 B2
(45) Date of Patent: Aug. 18, 2026

(54) PROTECTION ARCHITECTURE FOR AN ELECTRICAL PANEL

(71) Applicant: Span.IO, Inc., San Francisco, CA (US)

(72) Inventors: Birger Pahl, Milwaukee, WI (US); Ryan Carter Kroeze, San Francisco, CA (US)

(73) Assignee: Span.IO, Inc., San Francisco, CA (US)

( * ) Notice: Subject to any disclaimer, the term of this patent is extended or adjusted under 35 U.S.C. 154(b) by 107 days.

(21) Appl. No.: 18/609,765

(22) Filed: Mar. 19, 2024

(65) Prior Publication Data

US 2024/0266823 A1 Aug. 8, 2024

Related U.S. Application Data

(63) Continuation of application No. PCT/US2024/014480, filed on Feb. 5, 2024.

(60) Provisional application No. 63/483,523, filed on Feb. 6, 2023.

(51) Int. Cl.
*H02H 7/22* (2006.01)

(52) U.S. Cl.
CPC .................................... *H02H 7/22* (2013.01)

(58) Field of Classification Search
CPC ............ H02H 3/08; H02H 3/20; H02H 3/207; H02H 7/06; H02H 7/10; H02H 7/18; H02H 7/20
USPC .............................................. 361/93.1–93, 9
See application file for complete search history.

(56) References Cited

U.S. PATENT DOCUMENTS

| | | | |
|---|---|---|---|
| 5,572,438 | A | 11/1996 | Ehlers et al. |
| 6,018,203 | A | 1/2000 | David et al. |
| 7,016,174 | B2 | 3/2006 | Dougherty |
| 7,907,388 | B2 | 3/2011 | DeBoer et al. |
| 8,488,302 | B2 | 7/2013 | Mills et al. |
| 8,937,822 | B2 | 1/2015 | Dent |
| 9,190,836 | B2 | 11/2015 | Dent |
| 9,614,588 | B2 | 4/2017 | Dent |
| 9,634,552 | B2 | 4/2017 | Dent |
| 9,659,721 | B1 | 5/2017 | Sastry et al. |
| 9,735,703 | B2 | 8/2017 | Dent |
| 9,785,213 | B2 | 10/2017 | Dent et al. |

(Continued)

FOREIGN PATENT DOCUMENTS

| | | |
|---|---|---|
| CA | 2637087 A1 | 1/2009 |
| CN | 1183860 | 6/1998 |

(Continued)

OTHER PUBLICATIONS

PCT International Search Report and Written Opinion, PCT Application No. PCT/US 24/14480, Jun. 14, 2024, 18 pages.

*Primary Examiner* — Tuan T Dinh
(74) *Attorney, Agent, or Firm* — Fenwick & West LLP

(57) ABSTRACT

An electronic protection system is implemented in an electrical panel that distributes electricity to branch circuits at a site. The electronic protection system includes a current sensor, an actuator and a processor. The current sensor senses a current flow through a branch circuit. The actuator is used to de-energize the branch circuit. The processor controls the actuator based on the current flow sensed by the current sensor, according to a trip-time curve implemented by the processor. The trip-time curve specifies a maximum duration of current flow for different amounts of current flow.

20 Claims, 6 Drawing Sheets

(56) References Cited

U.S. PATENT DOCUMENTS 9,831,664 B1 11/2017 Sastry et al.
9,960,637 B2 5/2018 Sanders et al.
9,966,206 B1 5/2018 Sastry et al.
10,090,777 B2 10/2018 Dent
10,135,361 B2 11/2018 Dent
10,148,093 B2 12/2018 Dent
10,205,324 B2 2/2019 Dent
10,312,684 B2 6/2019 Niaki et al.
10,536,039 B2 1/2020 Haartsen
10,564,193 B2 2/2020 Kania et al.
10,663,443 B2 5/2020 Kates
10,666,161 B2 5/2020 Dent
10,784,710 B2 9/2020 Dent
10,840,735 B1 11/2020 Cooper
10,998,755 B2 5/2021 Dent
11,050,260 B2 6/2021 Narla et al.
11,196,272 B2 12/2021 Dent
11,228,171 B2* 1/2022 Dent .................... H02H 7/1227
11,342,754 B2 5/2022 Rao et al.
11,552,500 B2 1/2023 Rao et al.
11,642,977 B2 5/2023 Bhargava et al.
12,062,901 B2 8/2024 Rao
2003/0050737 A1 3/2003 Osann
2003/0063420 A1* 4/2003 Pahl .................... H02H 1/0015 361/93.1
2005/0068820 A1 3/2005 Radosevich et al.
2005/0099314 A1 5/2005 Aisa
2005/0116814 A1 6/2005 Rodgers et al.
2007/0064377 A1 3/2007 Deboer et al.
2007/0158171 A1 7/2007 Deboer et al.
2007/0247134 A1 10/2007 Ryan et al.
2008/0041704 A1 2/2008 McCoy
2008/0143461 A1* 6/2008 Hastings .................. H02H 7/18 335/7
2008/0310062 A1 12/2008 Kumfer et al.
2009/0018706 A1 1/2009 Wittner
2009/0021879 A1 1/2009 Rivers et al.
2009/0198459 A1 8/2009 Bilac et al.
2010/0010684 A1* 1/2010 Lorenz .................. H02J 7/0031 307/64
2010/0017045 A1 1/2010 Nesler et al.
2010/0163377 A1 7/2010 Frassineti et al.
2010/0289451 A1 11/2010 Tuffner et al.
2010/0301809 A1 12/2010 Bhade et al.
2011/0037429 A1 2/2011 Deboer et al.
2011/0172841 A1 7/2011 Forbes
2011/0301772 A1* 12/2011 Zuercher .................. H02H 7/20 700/292
2012/0127088 A1 5/2012 Pance et al.
2012/0212872 A1 8/2012 Padmanabh et al.
2012/0217954 A1 8/2012 Cook
2012/0286729 A1 11/2012 Yegin et al.
2012/0330473 A1 12/2012 Meredith et al.
2013/0030590 A1 1/2013 Prosser
2013/0057214 A1 3/2013 Stevens
2013/0120453 A1 5/2013 Carmi
2013/0249298 A1 9/2013 Dong et al.
2014/0063695 A1 3/2014 Martin et al.
2014/0088780 A1 3/2014 Chen
2014/0167787 A1 6/2014 Sanchez et al.
2014/0175881 A1 6/2014 Creed
2015/0035485 A1 2/2015 Wu et al.
2015/0162157 A1 6/2015 Luebke et al.
2015/0260761 A1 9/2015 Brick et al.
2015/0270695 A1 9/2015 Baker et al.
2015/0316944 A1 11/2015 Thellend
2016/0009354 A1 1/2016 Lai et al.
2016/0137087 A1 5/2016 Haas et al.
2016/0172840 A1* 6/2016 Luebke .................. H02H 3/207 361/111
2016/0178678 A1 6/2016 Pelletier et al.
2016/0226251 A1 8/2016 Tenca et al.
2016/0241017 A1 8/2016 Schroeder et al.
2016/0305797 A1 10/2016 Pietrasik et al.
2017/0141610 A1 5/2017 Niaki et al.
2017/0264817 A1 9/2017 Yan et al.
2017/0288384 A1 10/2017 Loewenstern et al.
2017/0302039 A1 10/2017 Tremaine et al.
2018/0048142 A1 2/2018 Immel et al.
2018/0048159 A1 2/2018 Narla et al.
2018/0205206 A1 7/2018 Bazhinov
2018/0253804 A1 9/2018 Madonna et al.
2018/0254633 A1 9/2018 Covic et al.
2018/0358839 A1 12/2018 Perez et al.
2019/0181690 A1 6/2019 Haartsen et al.
2019/0190266 A1 6/2019 Soulieres et al.
2019/0291594 A1 9/2019 Lu et al.
2019/0389315 A1 12/2019 Zhu
2020/0014206 A1 1/2020 Haartsen et al.
2020/0023747 A1 1/2020 Logvinov et al.
2020/0073342 A1 3/2020 Lee et al.
2020/0112199 A1 4/2020 Rao
2020/0259336 A1 8/2020 Rao et al.
2021/0083506 A1 3/2021 Rao et al.
2021/0362614 A1 11/2021 Carr
2022/0115859 A1* 4/2022 Zhou ........................ H01H 9/50
2022/0139191 A1 5/2022 Price et al.
2022/0140644 A1 5/2022 Dent
2022/0216697 A1 7/2022 Rao et al.
2022/0216728 A1 7/2022 Ashman et al.
2023/0120453 A1 4/2023 Rao et al.
2023/0120740 A1 4/2023 Lewchuk et al.
2023/0155482 A1 5/2023 Dent
2023/0163586 A1* 5/2023 Bareaud ................. H02H 3/087 361/93.1
2023/0179015 A1 6/2023 Rao et al.
2023/0396069 A1 12/2023 Rao et al.
2025/0038517 A1 1/2025 Rao
2025/0266711 A1 8/2025 Ashman et al.

FOREIGN PATENT DOCUMENTS

CN 201623478 11/2010
CN 101951014 1/2011
CN 102470775 12/2014
CN 105846403 A 8/2016
CN 106159990 11/2016
CN 103828167 1/2018
CN 206976837 2/2018
CN 106325240 10/2018
CN 105305406 8/2019
CN 107800376 8/2021
EP 2711233 B1 11/2024
WO WO-2011/019509 A1 2/2011
WO WO-2013/144947 A2 10/2013
WO WO-2014/175897 A2 10/2014
WO WO-2018/111977 A1 6/2018

* cited by examiner

PROTECTION ARCHITECTURE FOR AN ELECTRICAL PANEL

CROSS-REFERENCE TO RELATED APPLICATION(S)

This application is a continuation of International Application No. PCT/US24/14480, "Protection Architecture for an Electrical Panel," filed Feb. 5, 2024; which claims priority to U.S. Provisional Patent Application Ser. No. 63/483,523, "Protection Architecture for an Electrical Panel," filed Feb. 6, 2023. The subject matter of all of the foregoing is incorporated herein by reference in their entirety.

BACKGROUND

1. Technical Field

This disclosure relates generally to protection against electrical faults.

2. Description of Related Art

Electrical faults are unintended situations in the distribution of electrical power at a site, such as a residential home. Electrical faults can be dangerous. They can pose a safety hazard to people and can also cause significant damage to equipment. For example, electrical faults can cause electric shock, which can lead to serious injuries or even death. Electrical faults can also cause fires and explosions. Electrical faults can also cause equipment damage and failures.

Traditionally, devices such as circuit breakers, fuses, ground fault circuit interrupters, and surge protection devices are used to protect against certain types of faults. However, these devices are fairly unsophisticated and provide only the most basic protection against only the most basic types of faults. For example, if a circuit is carrying too much current, one of these devices may interrupt the circuit to halt the flow of electricity entirely.

BRIEF DESCRIPTION OF THE DRAWINGS

Embodiments of the disclosure have other advantages and features which will be more readily apparent from the following detailed description and the appended claims, when taken in conjunction with the examples in the accompanying drawings, in which:

DETAILED DESCRIPTION OF THE PREFERRED EMBODIMENTS

The figures and the following description relate to preferred embodiments by way of illustration only. It should be noted that from the following discussion, alternative embodiments of the structures and methods disclosed herein will be readily recognized as viable alternatives that may be employed without departing from the principles of what is claimed.

Introduction

The concepts described in this disclosure are applicable both to grid connected electrical systems and to electrical systems operated in an islanded mode. For systems operated in islanded mode, the system is disconnected from the grid and the "islanded" electrical system is being powered with a battery system, a photovoltaic system, the battery of an electric vehicle, or any other source like a generator or a fuel cell. Most of these sources have limited current and fault current protection compared to systems that are connected to the electrical grid. Protection in electrical distribution systems is generally provided by circuit breakers that provide current overload protection and short circuit protection for a grid connected system. For islanded systems, traditional breakers may not provide adequate protection.

Some of the protection concepts in this disclosure change the protection behavior based on the state of the system. Some also add protection mechanisms that are not available in legacy systems. One example is bi-directional overload protection.

In some cases, a whole panel protection scheme takes into account information from the state of the electrical distribution system outside the panel, as well as enhancing overload protection at the branch level. Traditional systems protect only at the branch-level.

Some or all of the protection strategies outlined here can be implemented inside of a home or commercial/industrial product (e.g. in an inverter or a battery storage system). The protection schemes can also be implemented in a separate controller coordinating with distributed sensing and protection devices. Features can be implemented individually or combined in any combination and not limited to the combinations that are expressly described in this disclosure. Some features may be described together, but they are not required to always be used together.

Figure 1:
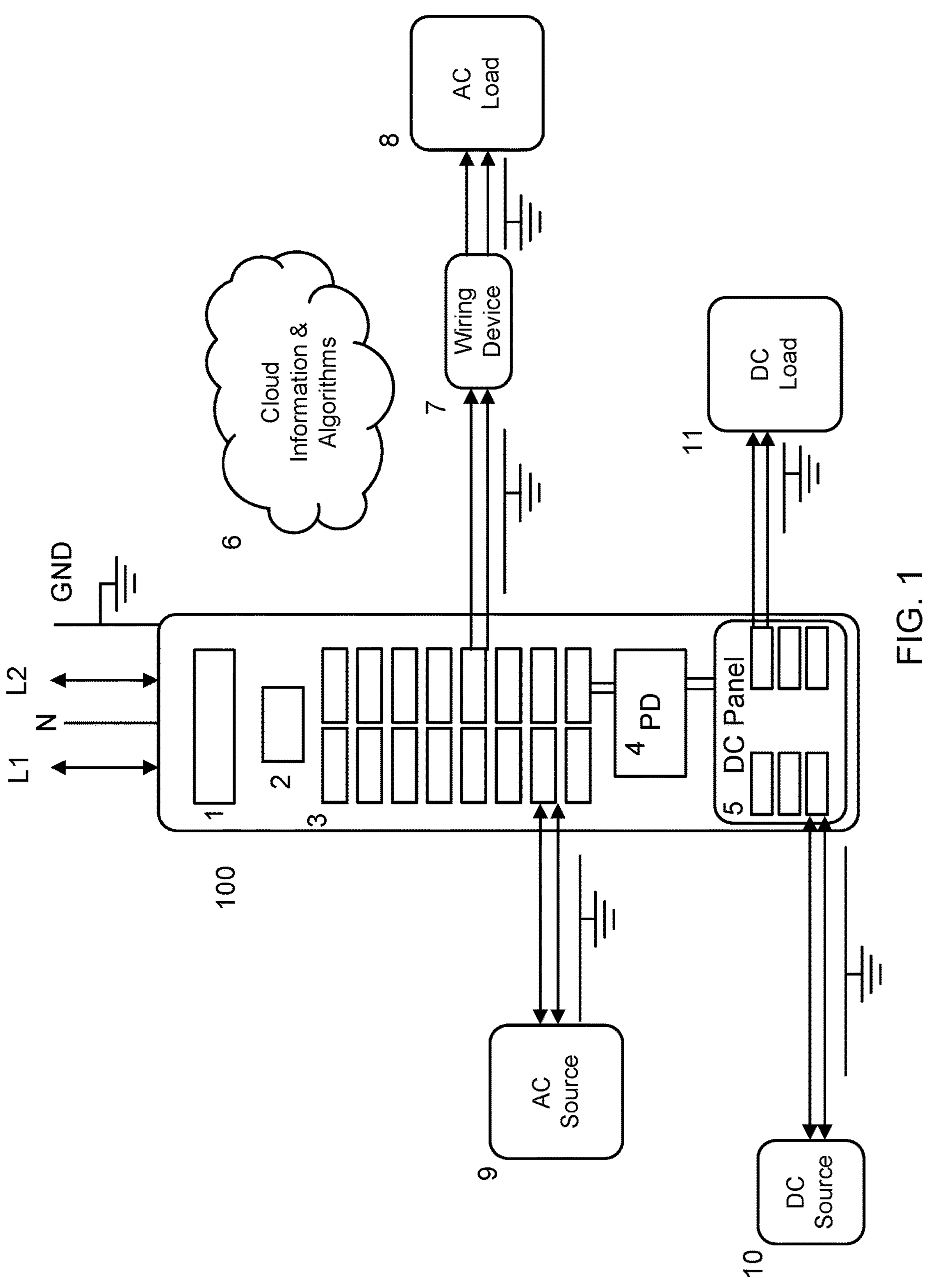
FIG. 1 is a representation of an electrical panel with an electronic protection system.

FIG. 1 shows a representation of an example of an electrical panel with AC and DC distribution and loads that are connected to the distribution panel. The panel can be connected to L1, L2, N & Ground 240V/120V single phase (as shown), or connected to 3-Phase 208V with L1, L2, L3, N & Ground, or to 2-Phase 208V/120V with L1, L2, N. There can also be a configuration for 400V/230V-3-Phase power systems of the IEC market. The sources and loads connected to the panel can be 120V (L1-N) as shown in FIG. 1 or 240V (L1-L2). The loads can also be bi-directional like a battery. The figure includes the following sub-systems.

The electrical panel (100) includes a main breaker (2) or a combination of a breaker and a microgrid interconnection device (MID) (1) that connects the panel to the AC distribution network. In this example, it also measures grid and home side voltages, and provides the information about grid-connected and islanded state. Inside the panel are several branch circuits with circuit breakers (3), an intelligent, active, and bi-directional power distribution box (4)

connecting an AC circuit to a DC Panel (5). Inside of the DC Panel there are several DC protection devices to distribute DC voltage to loads.

A number of AC branch circuits are connected to AC loads (8) through wiring devices (7). An AC branch can be used to connect a source (9) like a photovoltaic (PV) system and its inverter to the panel. The PV AC/DC is feeding power into the panel. The source (9) may be a bi-directional (AC) EV charger, and a circuit of the panel may be connected to the bi-directional (AC) EV charger. On the DC panel, there are similar loads/sources connected. All of these sources could have a DC/DC converter to manage them and to bring the voltage to a common DC voltage. FIG. 1 shows a DC source (10), for example a photovoltaic source or an electric vehicle EV, and a DC load (11). A battery system may also be connected.

The electrical panel includes the following hardware features. An edge compute unit takes data in the panel (e.g., differential and common mode voltage and differential and common mode current readings, temperatures, state of relays and breaker) and communicates to other connected devices like AC/DC inverters, DC/DC converters, EV chargers, battery systems, and wiring devices. The edge compute unit is also aware of the status and the power quality of the power grid that it is connected to. Being cloud connected, the edge computing device of the panel sends information to the cloud and receives information from the cloud. Algorithms for energy management system functions, safety functions, load identification and diagnostics functions are being executed by the local computing device or by the cloud computing hardware using the data sent from one or more panels. The compute architecture could use a single edge compute unit, or multiple compute units (clients) at a branch or module (multiple branches) level that feed the information to a central compute unit (server) inside of the panel serving as a gateway to connect to the cloud.

Residential load centers may contain a main breaker and multiple branch circuit breakers. Each breaker can be built to execute different protection algorithms as appropriate. Each breaker for example can execute algorithms to detect short circuits, overloads, or arcing faults. Some breakers might also have other smart features and are cloud connected.

The panel may provide multiple new protection functions that is important for a distribution system that is energized by different AC and DC sources (sometimes concurrently), can be connected and powered by the electrical grid and operate while disconnected from the grid (islanded mode), and/or is connected to devices capable of bi-directional current flow.

Hardware Protection Mechanisms

In order to provide protection, the panel may include a combination of any or all protection, sensing, and actuation hardware described here:

- Transient voltage suppression (TVS) devices like TVS diodes or MOVs at the MID and each branch circuit to provide protection against transients (like those resulting from a lightning strike into the power grid) for the loads. The TVS device may include a system to count events, estimate remaining life, provide indication that an event has occurred and an indication when the device has to be replaced. As an alternative implementation, a single use device can be used that would have to be replaced when an event has been detected and indicated.
- Current sensors at the grid connections and each branch connection. At the branch level, current sensing can be provided at the line side and the neutral side. To detect ground faults and provide a GFCI function, a GFCI CT sensing the differential current between the line and the neutral line can be added. This can also be done using two separate current sensors for a GFCI function on AC or DC circuits.
- Actuators like a relay, circuit breaker, solid state circuit breaker (SSCB), or other mechanisms to de-energize the branch circuit on the line side or the line and neutral side.
- An optional circuit breaker for each branch that is coordinated with the protection algorithms implemented in the panel.
- Processing circuits and microcontrollers, DSPs, FPGAs, or ASICs at the branch level to implement protection algorithms.
- A central compute unit and gateway to provide panel level protection algorithms and cloud based protection schemes.

These functions can be implemented inside the electrical panel or the functions can be distributed throughout the electrical system implemented in separate building blocks or collocated in systems connected to the electrical distribution system including several panels and subpanels.

Additional Safety Mechanisms

The panels described here may also provide a holistic solution where sensors are placed at each branch, algorithms are executed not only at the branch level but at a higher level after multiple sensors have been aggregated. This has the advantage that a more complete protection system can be built for the electrical distribution system taking the input of multiple circuits into account. Each branch circuit of the panel has a current sensor and a relay in combination with the circuit breaker. Using the current value as input and the relay as actuator, the panel can complement or replace the protection functions of the breaker while adding protection solutions that involve multiple branches enabling zone protection of the distribution system. Each branch circuit has a current sensor that can sense one or multiple of the following currents: AC current, DC current, common mode current, direction of current flow. Each of the breaches can have a voltage sensor downstream of the relay to indicate if the branch is energized when turned off.

Using the panel's branch relays and the disconnect device (MID) for the grid connection, each load can be isolated and the entire distribution system can be isolated using the MID. In the case of multiple panel installations, each function can be coordinated between panels through the compute unit communicating to other panels directly or through the cloud. The electrical system might have different energy sources and the MID could open putting the installation in islanded mode while energy sources connected to the branch circuits power the panel.

Local implemented protection and energy management system (EMS) features may include any or all of the following. The panel through its branch sensor can detect the state of the EMS by sensing:

- If the grid is available and how much power is flowing into or out of the panel
- The power quality of the grid to determine voltage level and quality of the 60 Hz voltage to determine possible brown-out, intermittent voltage abnormalities.

- Specific parameters of power quality like Total Harmonic Distortion (THD) of the grid waveform or load waveforms.
- The current direction of each branch circuit to determine the state of the loads and sources.
- Current magnitude of each branch and grid connection
- Power quality of each branch circuit by determining the 60 Hz shape and harmonics, DC offset
- Load wearout detection by monitoring trending over time or comparing the load to a model.
- Ground condition of each branch by measuring isolation to ground, ground leakage currents.

Providing Awareness

Using the EMS awareness features, the panel can give a warning for power quality conditions, like brown out, leakage currents to alert the owner/operator that something is wrong. There can be several alert levels for warnings and faults. A warning might be sent just to the app of the operator phone, where a fault (e.g. an isolation fault) can de-energize that circuit branch.

Another set of warnings can be sent to the installer/electrician application to give awareness of the state of the panel before a circuit is de-energized. The electrician then can troubleshoot the fault condition more quickly by knowing what had led to opening a circuit.

Concurrent Fault Protection

Figure 2:
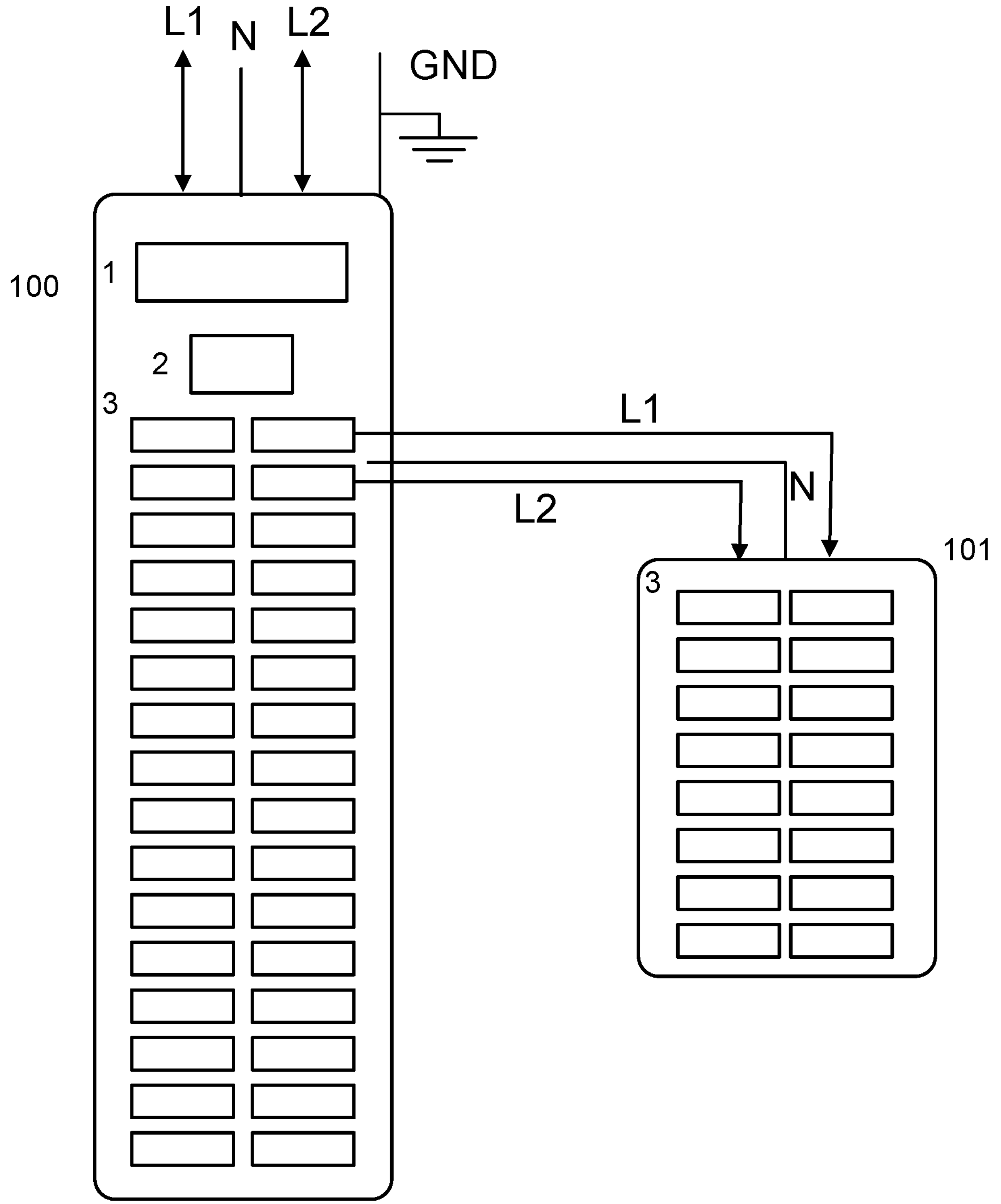
FIG. 2 is a representation of electricity distributed through a main panel connected to a sub panel.
Figure 3:
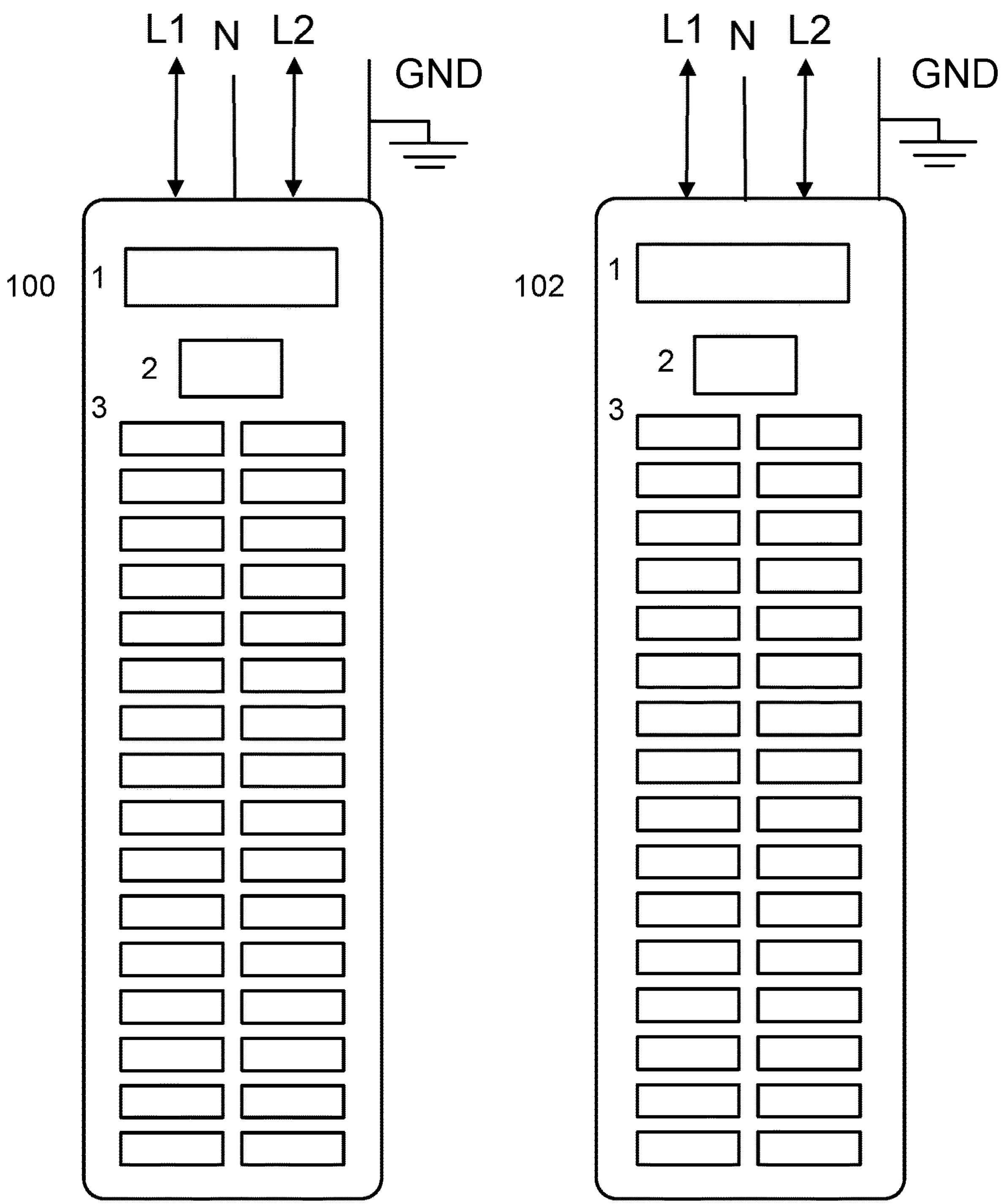
FIG. 3 is a representation of electricity distributed in parallel through two separate panels.

FIGS. 2 and 3 show a few alternatives of installations using more than one electrical panel. FIG. 2 shows a main breaker panel (100) with a sub-panel (101) fed from it. FIG. 3 shows two individual breaker panels (100 and 102) tied to the grid or fed from an upstream breaker panel. One can think of many combinations of breaker panels and subpanels. These panels can be at the same house, campus, neighborhood, or any other location.

One of the advantages of having a holistic view through the panel is that protection now can be coordinated with several breakers or panels. Zone protection can be implemented. For example, several breakers of the basement could trip due to a flooding event. The panel can command that all branches in the basement zone be de-energized protecting the entire zone. If the system is powered by multiple panels, virtual zones including branch circuits from each panel may be grouped together.

External sensors can be used to trigger zone protection. For example, a water sensor can trigger the panel to shut down power in the compromised zone, e.g. de-energizing the circuits in the basement or laundry area. A water flow sensor for example can indicate a problem in the plumbing or an appliance the panel will react accordingly. A smoke detector or environmental sensor could be an indication a hazardous condition could be the input to the panel to control circuits to react to it.

A catastrophic event to the structure can be caused by external events like flooding due to a hurricane, a wildfire, or other events. The panel can respond to sensors or input external from the house, or from a command triggered externally to put the structure into an electrically save state.

Virtual sub-panel/Zone protection: In traditional electrical systems with backup generation, a sub-panel is installed that is fed by a breaker in the main panel through a transfer switch. The subpanel again has a main breaker with a rating. This panel can group branch circuits together to form a virtual sub panel and define a virtual main breaker rating for this group of circuits. If the rating of the sum of the currents exceeds the virtual main breaker rating, load shedding can reduce the current draw for this subset of circuits, or the virtual main breaker can trip resulting in de-energizing all the circuits in this group.

This group of branch breakers can be a subset of breakers in a single panel, or it can be a number of branch breakers from different panels and subpanels grouped together to form a virtual sub-panel. One could for example group all breakers together that feed the heating and cooling circuits in a house. The circuits in a virtual sub-panel can be grouped and controlled via local communications in a microprocessing unit like a gateway that is part of a panel. They could also be grouped together via cloud connectivity forming a virtual sub-panel spanning a house, a campus, or a neighborhood.

Virtual sub-panels can include branch circuits from different panels that are on the same physical installation or even across the cloud at different locations. Using virtual sup-panels one can group circuits together to give them a combined virtual main breaker, for example grouping all the building system loads (HVAC, water heater) together; or grouping zones or load types together in a virtual panel. This could be used to give these circuits a combined virtual ampere rating, designating a certain capacity to these circuits.

Virtual sub-panels can be used to identify protection zones. It is used to prevent the spread of faults by de-energizing an entire zone or adjacent zones when faults occur. Using the concept of virtual sub-panels, several zones can be created for the same loads and sources. One zone can be used for load control, one zone can be used for protection with some of the loads overlapping in both zones.

Dynamic Overload/Custom Overload Protection

The traditional load center consists of a main breaker connected to the 240V/120V distribution transformer of the grid and several branch circuits protected by circuit breakers, distributing electricity to the loads of the house. The circuit breaker of a load center generally has a rating of 120V and 15 A or 20 A. There are other breakers for dedicated loads like A/C that have higher ratings and can be 120V single pole or 240V double pole breakers.

Protection against electrical overloads, short circuits, arc faults, or ground faults is provided by these branch circuit breakers. The protection is static, generally meant to protect the wire of the branch from overheating.

Of course if all branches are loaded at 100%, the capacity of the main breaker would be exceeded and it would trip, de-energizing the entire dwelling. With the introduction of multiple sources, grid-connected operation, and islanded operation, the available current of the entire panel may also fluctuate and be limited to the generating source or sources. It might be that the available fault current is a lot smaller than the breaker rating. Another scenario might be that the combination of sources that is being back fed into the panel from the branch circuits exceeds the allowable maximum current of the panel. To provide protection, dynamic trip-time curves may be used. A trip-time curve is a curve of allowable duration as a function of current. If the current exceeds the allowable duration specified in the trip-time curve, then the circuit should be tripped (de-energized). Implementing trip-time curves electronically provides more flexibility in defining and changing the levels of protection.

Bi-directional trip-time curves: As shown in FIG. 1, the panel is connected to equipment that can either consume or source electrical power, e.g. the battery unit can be charged acting like a consumer or it can be discharged, acting like a source. It is advantageous to be able to implement an overload and short circuit curve that behaves differently depending on the direction of power flow. The charging and discharging currents of a battery system are often different and the overload curves to that branch can be changed depending on current direction, ensuring that the circuit is protected when there is a fault condition like an overload or a short circuit. For traditional breakers, for example, the short circuit trip instantaneous trip is set somewhere between 10× and 20× of the breaker rating. An inverter fed system might not be able to source as much current and the dynamic trip curve will be adjusted below the maximum value of the inverter system.

It is useful to be aware of which circuits can source power into the panel. One feature of a bi-directional trip-time curve is to disallow current flow into the panel for normal electrical loads, thus preventing the operator to "backfeed" circuits with a generator of other source, or to prevent faulty devices to feed power back into the panel. A unidirectional trip-time curve will only allow current flow in one direction. This backfeed protection mechanism will also prevent motor loads from feeding "re-generative" power back into the panel and protect the panel and other assets connected to it.

I2t curves based on load detection: The branches of the panel can be de-rated by implementing an electronic trip-time curve at lower currents, freeing up capacity for other high current loads such as vehicle chargers or heat pumps. The panel through its branch circuits may learn the load characteristics of each connected circuit and over time will know what is connected. Through load-disaggregation the panel is able to identify the loads connected and can model load profiles. This information is used to provide a custom trip-time curve for the connected load or loads. This enables the panel to provide branch-level equipment protection custom for each branch.

Dynamic overload: When the system is in islanded mode and powered by inverter sources or generators, the overall power through the load center can be reduced. Very often there is a light load on a branch circuit far below the rating of the branch. One can load shed every circuit that is not essential to power things like the refrigerator or the HVAC system and reduce the amount of load to the sources. A panel may know how much current draw has been on each circuit in the past. We can derate each circuit with a dynamically changed overload curve to keep as many circuits on as possible. The overload curve is dependent on the total available electrical power to the panel.

Missing current detection/missing power (energy): A panel may be connected to several intelligent power systems in FIG. 1. Each of these systems will report their state of energy production or consumption back to the panel. The reported energy can be confirmed by the measured energy at the panel. If the energy levels are different it means that there has been a fault or that there might have been a mistake in the wiring. The panel can report the fault and de-energize the branch. Sensors and/or actuators can also be distributed in separate units distributed in the electrical installation communicating back to the main panel. Sensors and actuators can also be included inside of wiring devices like switches and outlets. These sensors can include remote metering devices that communicate via wired or wireless connections with one or more panels Ground Fault Circuit Interruption (GFCI) or Residual Current Detection (RCD): The panel has the sensing means to detect ground fault currents. The sensing level can be adjusted to provide various forms of protection, e.g. 6 mA for personnel protection, or 30 mA for equipment protection. The panel may measure ground fault levels, keep track of trending, and send the information to the cloud. The panel can provide a warning if ground fault currents are present at a pre-trip level or perform a trip to protect the users or equipment. A fault indication and specifics about the fault condition may be given.

Figure 4:
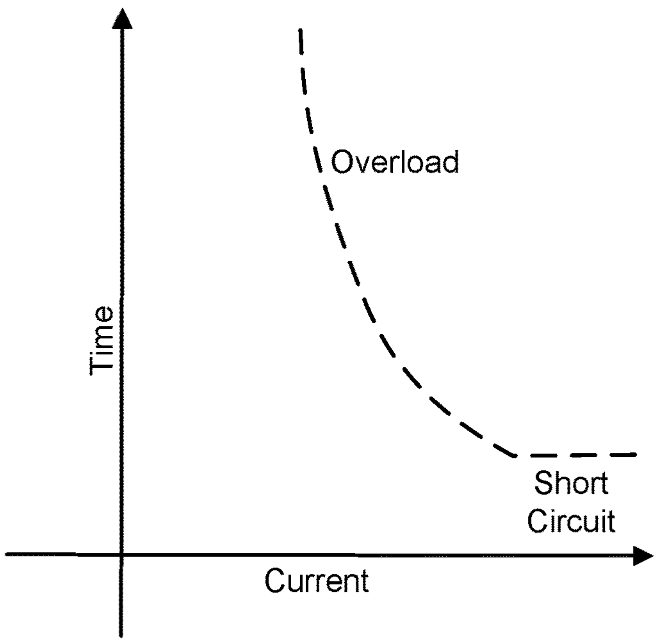
FIG. 4 shows a simplified trip-time curve of a circuit breaker.

FIG. 4 shows a simplified trip-time curve of a typical circuit breaker consisting of a region providing overload protection and a region for short circuit protection.

Branch protection may be implemented by a circuit breaker in series with a controllable device like a relay. The relay is controlled by a programmable device like a microprocessor. The microprocessor is aware of the current amplitude and direction through a current sensor sensing the current in the branch going to the load or being sourced from the generating source. The microprocessor implements an electronic trip-time curve that protects for lower currents. This electronic trip-time curve is coordinated with the circuit breaker's protection curve in a way that the relay will trip before the circuit breaker will. This will enable being able to change the trip-time behavior of that branch and coordinating fault protection of several branches to provide more advanced circuit protection.

Figure 5:
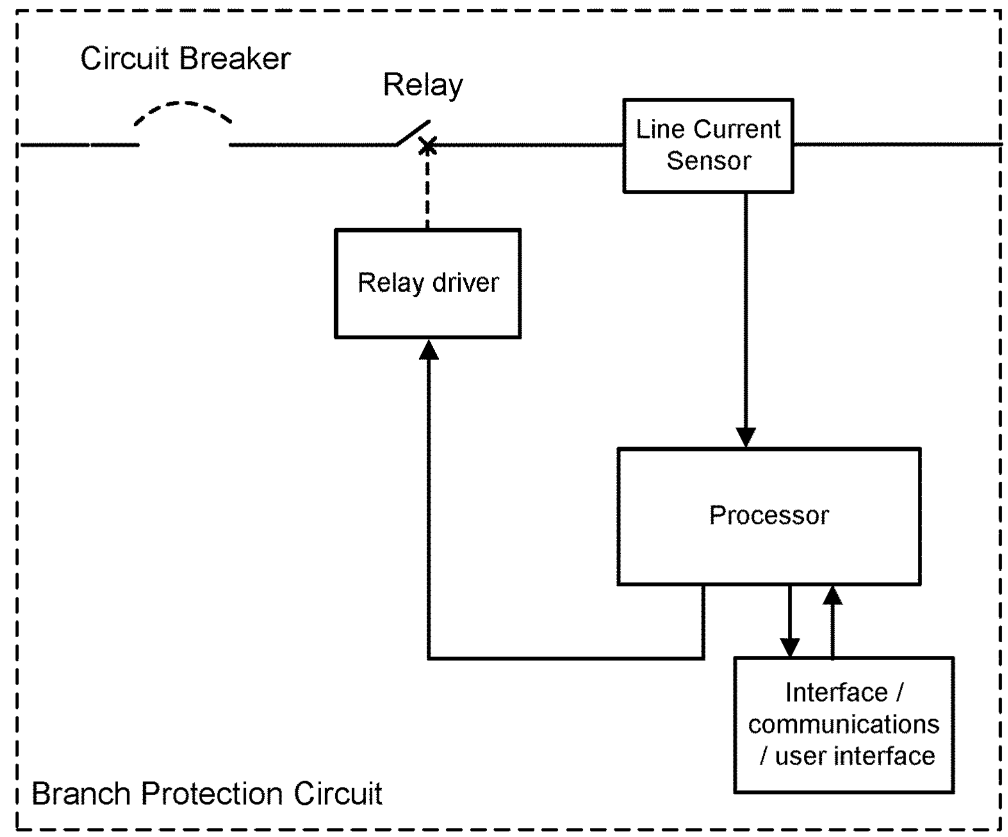
FIG. 5 shows a block diagram of an electronic protection system.

FIG. 5 shows a block diagram of an electronic protection system with such a trip-time curve. The panel has several branch circuit protection systems that consist of the traditional breaker, but it also includes a relay that can be controlled and a current sensor that measures the current and current direction of the branch. A processing unit takes the reading of the current sensor and can control the relay.

Using the configuration above, the panel will protect the same way a traditional electrical panel with circuits breakers does, with normal circuit breakers as required by the National Electrical Code (NEC). With the addition of a relay or other electrical disconnect device, different tip-time curves can be implemented using the relay.

Figure 6:
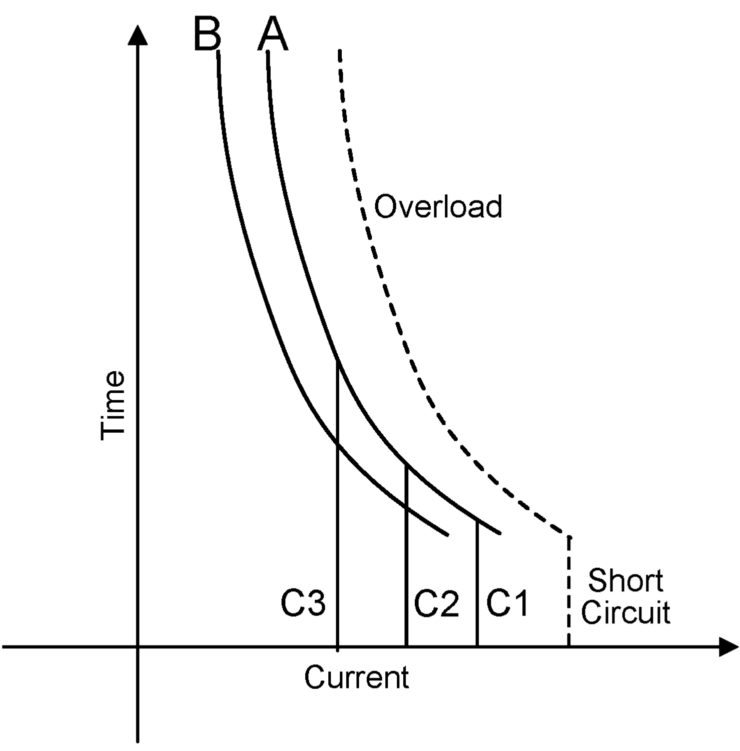
FIG. 6 shows a trip-time curve of a circuit breaker and several trip-time curves implemented electronically.

FIG. 6 shows the trip-time curve of the circuit breaker (dashed line) and several trip-time curves implemented electronically. With this approach, the following are possible:

- Implement a trip-time curve that trips just before the breaker would trip ensuring control of brank circuit to be determined by the electronic protection system.
- Implement a trip-time curve that derates the branch to a lower current level (e.g. combination of B and C1).
- Implement different combinations of overload trip-time curves (A or B) and short circuit trip-curves (C1, C2, C3)
- Dynamically change branch protection behavior throughout the operation
- A trip-time curve (B & C1) can be implemented to provide a warning to the user for a predetermined level or trip-time curve prior to tripping the branch according to another curve (A & C2)—e.g. B could be set at 80% of A.

Figure 7:
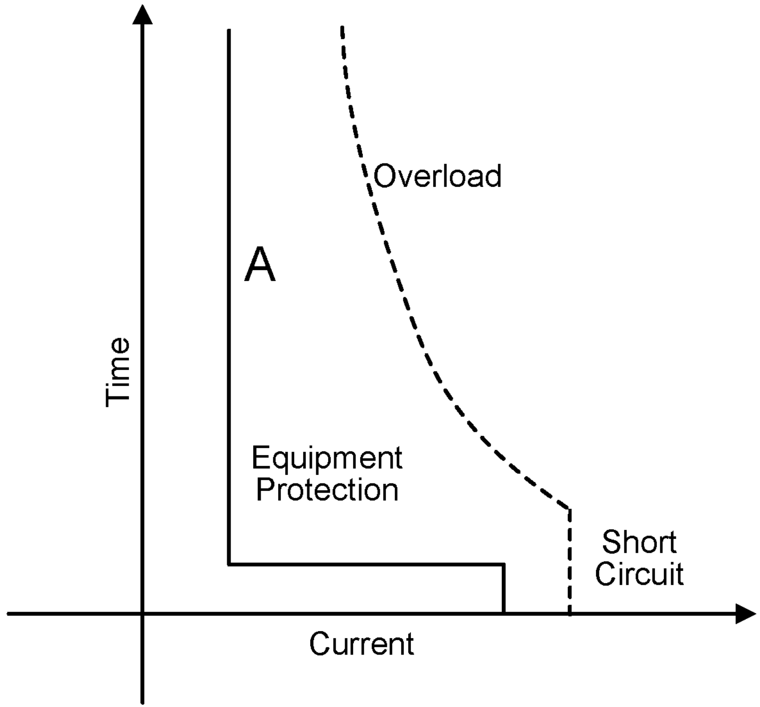
FIG. 7 shows a trip-time curve for equipment protection, implemented to ensure tripping faster than the circuit breaker in the branch, derating the branch circuit.

An electric protection system also allows for a different trip-time curve to be implemented. Generally a circuit breaker's overload trip-time curve is chosen to provide protection of overheating for the size of the wire used in the branch. The electronics protection system can for example implement different trip-time curves like equipment protection. FIG. 7 shows a typical equipment protection curve implemented to ensure tripping faster than the circuit breaker in the branch, derating the branch circuit.

Figure 8:
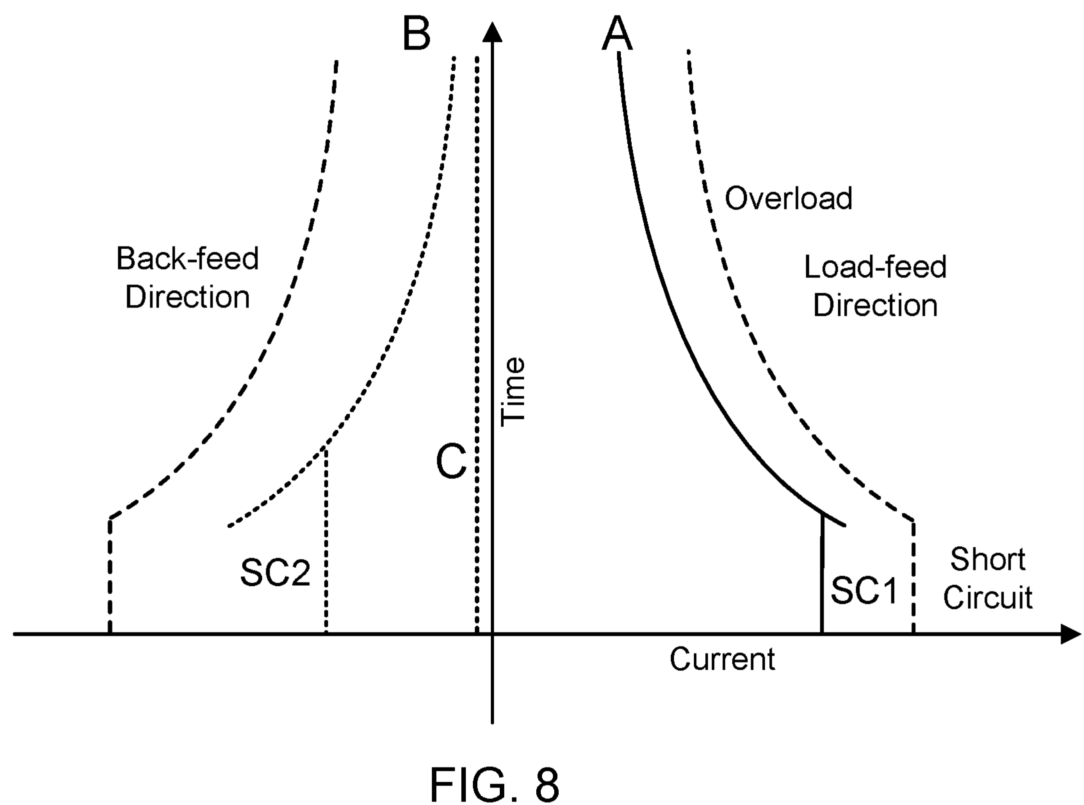
FIG. 8 shows different trip-time curves depending on the direction of current.

The electronic protection system can implement different trip-time curves depending on the direction of current, as shown in FIG. 8. A traditional circuit breaker would have the same trip-time characteristic for the negative current direction. This can:

Ensure different trip-time characteristics for back-feeding than for feeding (e.g. as shown above, lower rating in the negative current directing (B & SC2)

Provide an instant trip for any negative current direction (C)

Fault Algorithms Based on Fault Signature and Load Identification

Traditional electrical panels employ circuit breakers or fuses that generally only implement fault algorithms based on the magnitude of the current and the time the current is present. Panels described here may make use of signature analysis on the current and voltage using machine learning algorithms, deep learning methods, or other analytical methods to determine if an unsafe condition exists.

Load ID assisted fault algorithms: Load identification may assist all the fault algorithms. It may be used to remove noise or harmonics to get a cleaner signal of the load current. Once identified, the loads may be compared with a load library in the cloud to determine overall health. A library of load and source faults in the cloud may help identify unhealthy conditions based on the data sent back to the cloud. This mechanism customizes arc fault algorithms described below.

Series arcs: A panel may be connected with several intelligent power systems with its own sensing capability. The current and voltage is reported back to the panel. If a series arcing fault (e.g. due to a loose connection), or a high impedance fault (to ground or at a junction point) the voltage at the load can be substantially lower than at the panel. The panel will compare the voltages and issue a fault state when they are different.

Parallel arc: Parallel arcs (arcing faults to neutral or ground) exhibit intermittent high current spikes that might not trigger the overload or short circuit protection mechanism of regular circuit breakers. A panel may be monitoring each branch circuit and detecting the presence of a parallel arcing fault. The arcing fault algorithm may be dynamically adjusted to account for the available fault current when the panel is in islanded mode.

Abnormal Condition Protection

The electrical panel described here may monitor for abnormal conditions resulting from the grid or the home wiring to ensure safe operation and to ensure the integrity of the home electrical system is safe. This includes monitoring trending over time and comparing key parameters with stored historical values on the panel or in the cloud.

Circuit Isolation/Isolation fault Integrated in each panel is an isolation monitor that will measure the impedance between neutral and ground before energizing the panel.

This may be done for AC and DC circuits. The DC and AC sections of the panel can be isolated independently and from each other.

Overvoltage/Undervoltage and lightning protection/transient voltage protection: Integrated into the main board, main breaker, and/or main branch is a transient voltage suppression (TVS) device, protecting the panel and each branch from overvoltages due to overvoltage conditions coming from the distribution network due to lightning or other transient events. The panel provides comprehensive protection for transient voltage events. In present systems, TVS devices provide passive whole home protection. There is no way to know the state of these devices. The panel may track transient events and count them. A state-of health indication is given after a number of events. The panel may measure the leakage current of transient protection devices or track the clamping voltage to know the health of these devices and indicate when TVS protection is compromised and service is needed.

During an overvoltage event in grid-connected or islanded mode, the panel disconnects that source to protect itself and connected loads. During an undervoltage event, loads and sources are disconnected to protect the equipment. Overvoltage protection can be individualized per source and circuit for the AC circuits or the DC circuits.

Power Quality Abnormalities: The panel monitors the load and source total harmonic distortion (THD) of the various sources (inverter fed or grid) and loads and determine abnormal conditions to notify the user or bring the panel to a safe state.

Load wearout detection: The branch circuits of the panel sense the current signature and send parameters to the local compute or cloud compute platform. The panel tracks historical data and monitor the load, detecting load changes or load degradation over a timespan from seconds, minutes, days, months, and years. The panel may monitor and track the health of itself and its components, store historical data and trends in the cloud, and provide warnings about the health of the panel. Sources connected to the panel or connected to the electrical system may be monitored and trending data is stored and analyzed in the cloud.

Grid-State Detection Service

The Panel may detect the state of the grid and report grid state conditions like brown-out, black-out, voltage levels, frequency to the cloud or to the utility. It may be aggregated over a neighborhood or region to be able to provide region-wide grid status. Aggregated information from many panels can be used in the cloud to diagnose how grid conditions originate and travel through the grid and that information may provide information valuable to the utility.

Home Awareness

The panel incorporates a home awareness mechanism that is used to build a model of the electrical system with all branch circuits, main connection, panels, sub-panels, sources, and loads. This cloud-assisted model may be used to create a schematic of the electrical wiring system and may be used to assist with fault protection algorithms tuned to that system. Without any input from an installer, the load types are identified and a library of what current signatures are created. This helps identify unusual current signatures that can be flagged.

Power Electronics Assisted Features

The panel includes an AC/DC converter to connect to DC storage devices like batteries, EVs, or PV. Using the converter, power can be provided during power outages. The health of the power electronic system and their passive components like capacitors and inductors are monitored and stored in the cloud.

Cloud-Connected Protection Features

In the case of multiple panels in one installation, the protection features mentioned here can be extended to cloud or locally connected and communicating panels. Virtual sub-panels can be defined across multiple panels, dynamic overload curves and zones can be defined across multiple panels.

The panels may send branch level information to the cloud. The cloud stores historical parameters and can determine if the behavior of the branch circuits change or drift over time. The algorithms may learn what kind of transient and steady-state signals are present for each branch, learn what type of loads are present and then alert the operator of any anomalies.

The cloud is used to aggregate large amounts of data and keep historical data and trending, keep track of configuration changes of the panel's electrical system and manage inter-panel communications and coordination. Using the data stored of the present state and having the historical data enables cloud-based deep learning algorithms to optimize the protection schemas and analyze the robustness of the individual protection devices. This knowledge then can be used to load shift or reconfigure the electrical system or update individual devices to perform better. Post processing and trending data can be used to give the user or installer a holistic view of the system, pin-point where faults occur and give the electrician information on past faults, fault location, circuits that are regularly overloaded (e.g. a circuit is regularly loaded over 80% capacity but not enough to be tripped). Using the information of cloud-connected panels within a region, decisions in response to an event in a larger geographic area can be made, e.g. in response to a seismic event, flooding, or wildfire. For all faults and fault types, a detailed history log of all fault types are kept and it is used for diagnostic purposes of the overall electrical system and to provide information to an electrician or for system optimization.

Although the detailed description contains many specifics, these should not be construed as limiting the scope of the invention but merely as illustrating different examples. It should be appreciated that the scope of the disclosure includes other embodiments not discussed in detail above. Various other modifications, changes and variations which will be apparent to those skilled in the art may be made in the arrangement, operation and details of the method and apparatus disclosed herein without departing from the spirit and scope as defined in the appended claims. Therefore, the scope of the invention should be determined by the appended claims and their legal equivalents.

What is claimed is:

1. An electronic protection system implemented in an electrical panel for a site, wherein the electrical panel distributes electricity from a source to branch circuits at the site, the electronic protection system comprising:

a current sensor configured to sense a current flow through a branch circuit;

an actuator configured to de-energize the branch circuit; and a processor that controls the actuator based on the current flow sensed by the current sensor and according to a trip-time curve implemented by the processor, wherein the trip-time curve specifies a maximum duration of current flow through the branch circuit for different amounts of current flow through the branch circuit;

wherein the current sensor, actuator and processor are all implemented in the electrical panel.

2. The electronic protection system of claim 1 wherein the trip-time curve specifies different maximum durations for current flows in opposite directions through the branch circuit.

3. The electronic protection system of claim 1 wherein the trip-time curve disallows current flow into the electrical panel from the branch circuit.

4. The electronic protection system of claim 1 wherein the processor dynamically changes the trip-time curve based on conditions at the site.

5. The electronic protection system of claim 1 wherein the trip-time curve is updateable by download over the Internet.

6. The electronic protection system of claim 1 wherein the electrical panel is operated either in a grid-connected mode or in an islanded mode, and the processor changes the trip-time curve based on the mode.

7. The electronic protection system of claim 1 further comprising:

a circuit breaker in series with the actuator, wherein the circuit breaker de-energizes the branch circuit upon a current overload.

8. The electronic protection system of claim 1 wherein the processor also provides a warning according to a second trip-time curve implemented by the processor.

9. The electronic protection system of claim 1 wherein the trip-time curve provides protection against damage for equipment on the branch circuit.

10. The electronic protection system of claim 1 wherein the trip-time curve is software-defined.

11. The electronic protection system of claim 4 wherein the processor derates the trip-time curve based on electrical power available to the electrical panel.

12. The electronic protection system of claim 4 wherein the processor dynamically changes the trip-time curve based on a load on the branch circuit.

13. The electronic protection system of claim 4 wherein the processor selects the trip-time curve from a set of trip-time curves for different conditions at the site.

14. The electronic protection system of claim 7 wherein the trip-time curve specifies a protection below the current overload of the circuit breaker.

15. An electronic protection system implemented in an electrical panel that distributes electricity to branch circuits at a site, the electronic protection system comprising:

multiple current sensors configured to sense current flow through different branch circuits;

multiple actuators configured to de-energize the branch circuits; and a processor that controls the actuators based on the current flows sensed by the current sensors according to trip-time curves implemented by the processor, wherein at least two of the branch circuits are controlled by different trip-time curves, and each trip-time curve specifies a maximum duration of current flow for different amounts of current flow.

16. The electronic protection system of claim 15 wherein at least one of the trip-time curves specify different maximum durations for current flows in opposite directions through the branch circuit.

17. The electronic protection system of claim 15 wherein the processor dynamically changes at least one of the trip-time curves based on conditions at the site.

18. The electronic protection system of claim 15 further comprising:

a circuit breaker in series with at least one of the actuators, wherein the circuit breaker de-energizes the branch circuit upon a current overload, and the trip-time curve for that branch circuit specifies a protection below the current overload of the circuit breaker.

19. The electronic protection system of claim 17 wherein the processor dynamically changes the at least one trip-time curve based on a load on one of the branch circuits.

20. The electronic protection system of claim 17 wherein the processor selects the at least one trip-time curve from a set of trip-time curves for different conditions at the site.

* * * * *